United States Patent
Chen

(10) Patent No.: US 7,357,085 B2
(45) Date of Patent: Apr. 15, 2008

(54) MACHINE GUIDEWAY EMPLOYING ELECTROMAGNETIC SUSPENSION

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 338 days.

(21) Appl. No.: 10/845,306

(22) Filed: May 12, 2004

(65) Prior Publication Data

US 2004/0226475 A1    Nov. 18, 2004

(30) Foreign Application Priority Data

May 14, 2003    (TW) .............................. 92113124 A

(51) Int. Cl.
*B60L 13/04* (2006.01)

(52) U.S. Cl. .................................................... 104/282

(58) Field of Classification Search ............ 104/86.02, 104/88.01, 88.06, 287, 283, 286, 292; 198/619, 198/811; 269/8, 909, 73; 335/285, 216, 335/300; 310/12, 14, 309; 29/559
See application file for complete search history.

(56) References Cited

U.S. PATENT DOCUMENTS

| | | | | |
|---|---|---|---|---|
| 3,074,269 A | * | 1/1963 | Wohl ............................. | 73/665 |
| 3,626,113 A | * | 12/1971 | Jones et al. .................... | 360/86 |
| 3,854,889 A | * | 12/1974 | Lemelson .................... | 29/33 P |
| 4,129,291 A | * | 12/1978 | Kato et al. .................... | 269/73 |
| 4,505,464 A | * | 3/1985 | Chitayat ....................... | 269/73 |
| 4,624,617 A | * | 11/1986 | Belna .......................... | 414/347 |
| 4,691,183 A | * | 9/1987 | Vernikov et al. ............ | 335/289 |
| 4,805,761 A | * | 2/1989 | Totsch ......................... | 198/619 |
| 5,058,505 A | * | 10/1991 | Uehira ......................... | 104/284 |
| 5,094,173 A | * | 3/1992 | Tada et al. ................... | 104/282 |
| 5,249,529 A | * | 10/1993 | Herbermann ................ | 104/281 |
| 5,253,591 A | * | 10/1993 | Rote et al. .................... | 104/281 |
| 5,396,206 A | * | 3/1995 | Herd et al. ................... | 505/163 |
| 5,586,504 A | * | 12/1996 | He et al. ...................... | 104/282 |
| 5,605,100 A |   | 2/1997 | Morris et al. | |
| 5,628,252 A | * | 5/1997 | Kuznetsov ................... | 104/284 |
| 5,732,938 A | * | 3/1998 | Rajanathan et al. ........ | 269/216 |
| 5,868,077 A | * | 2/1999 | Kuznetsov ................... | 104/281 |
| 6,029,104 A | * | 2/2000 | Kim ............................. | 701/20 |
| 6,044,770 A | * | 4/2000 | Davey et al. ............... | 104/282 |
| 6,644,640 B1 |   | 11/2003 | Russick et al. | |

FOREIGN PATENT DOCUMENTS

JP    2002074615 A    *    3/2002

* cited by examiner

*Primary Examiner*—S. Joseph Morano
*Assistant Examiner*—Robert J. McCarry, Jr.
(74) *Attorney, Agent, or Firm*—Wei Te Chung

(57) ABSTRACT

A machine guideway for used in machine processing includes a base (10, 40), a slide block (20, 50) slideably received in a sliding groove of the base, and an electromagnetic suspension system. The electromagnetic suspension system provides a repulsion force having a direction opposite to that of gravitational force action on the slide block during sliding of the slide block along the sliding groove to an original starting position. When the repulsion force is greater than the gravitational force, the slide block can freely slide along the sliding groove. Therefore, the speed of processing is enhanced. In addition, the guidway does not sustain any wear due to friction. Furthermore, the guideway does not sustain any deformation due to friction heat.

11 Claims, 4 Drawing Sheets

MACHINE GUIDEWAY EMPLOYING ELECTROMAGNETIC SUSPENSION

BACKGROUND OF THE INVENTION

1. Field of the Invention

The present invention relates to machine guideways, and more particularly to a machine guideway used in machines on production lines.

2. Description of Prior Art

Machine processing in factories plays a very important role in industrialized societies. Generally, speed and precision are two basic criteria used to evaluate the efficacy of machine processing. Especially for large processing machines, improving the processing speed can lower processing costs and enhance the machine's efficiency. The speed of a processing machine mainly depends on the time needed to actually work on a workpiece positioned on a supporting block of a guideway of the processing machine as the block moves along the guideway, and a time needed to return the block along the guideway to its original starting position after the workpiece has been worked on. The time needed to work on a workpiece is difficult to shorten, because this often entails reducing precision. The time needed to return the block is an important avenue by which the processing speed can be improved.

Generally, several basic means have been employed by technicians in order to improve the processing speed of processing machines. For example, lubricants can be added into the guideways, or rollers can be employed in the guideways. These means lower coefficients of friction in the guideways and improve the efficiency of processing machines.

However, the above described methods cannot completely eliminate the friction in the guideways. The friction not only slows down processing speeds, but also causes the guideways to wear over time. In addition, heat generated by the friction can cause deformation of the guideways. Such wear and deformation reduce the precision of processing.

SUMMARY OF THE INVENTION

In view of the above-described drawbacks, an object of the present invention is to provide a machine guideway for use in automated processing equipment which has enhanced speed.

Another object of the present invention is to provide a machine guideway for use in automated processing equipment which enables a block of the guideway to quickly return to its original starting position after a workpiece has been worked on.

In order to achieve the objects set out above, a machine guideway in accordance with the present invention comprises a base, a sliding groove defined in the base, a slide block slideably received in the sliding groove and an electromagnetic suspension system. The electromagnetic suspension system provides a repulsion force having a direction opposite to that of gravitational force action on the slide block during sliding of the slide block along the sliding groove to an original starting position. When the repulsion force is greater than the gravitational force, the slide block can freely slide along the sliding groove. Therefore, the speed of processing is enhanced. In addition, the guideway does not sustain any wear due to friction. Furthermore, the guideway does not sustain any deformation due to friction heat.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
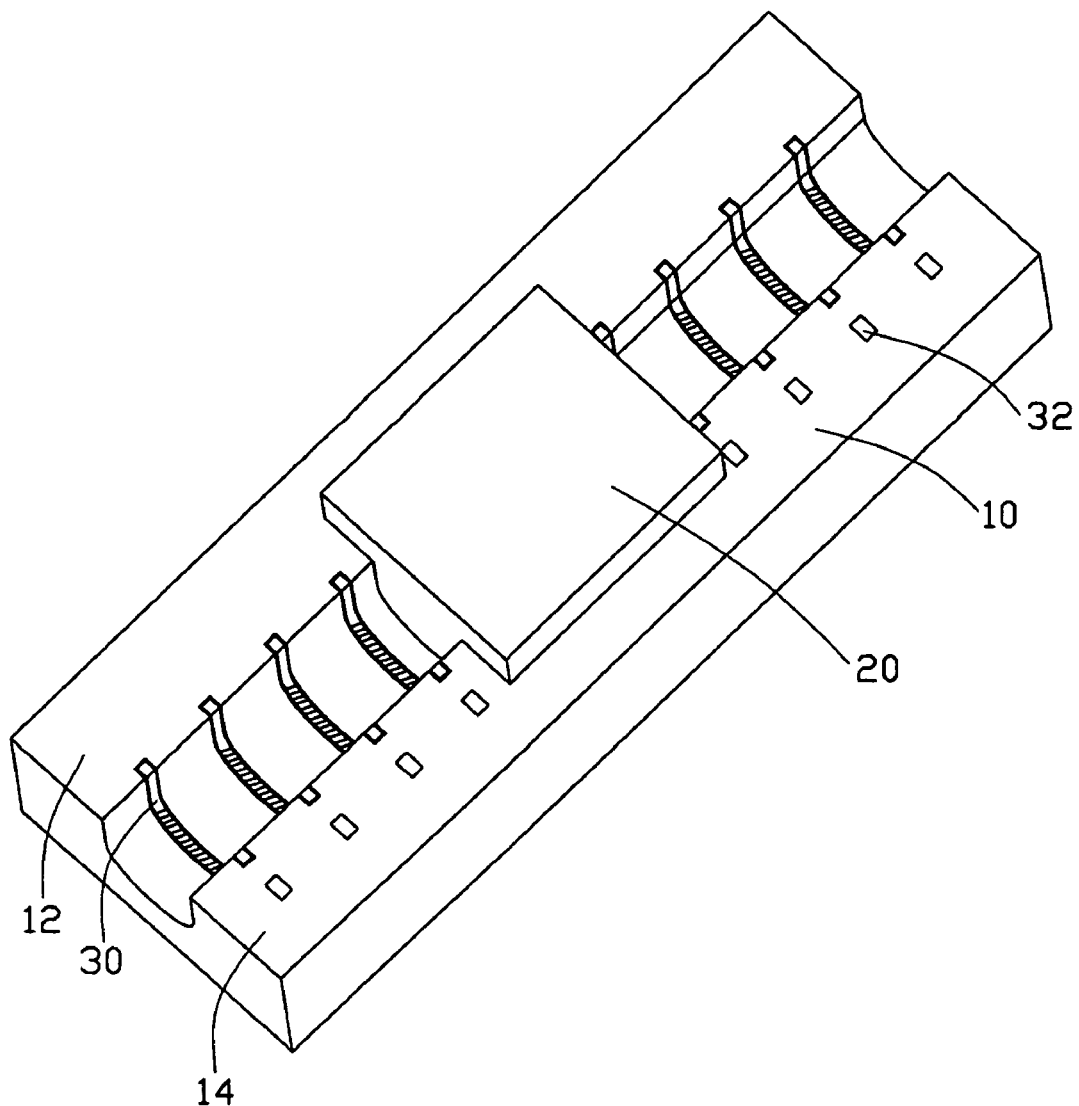
FIG. 1 is an isometric view of a machine guideway employing a standard electromagnetic suspension system in accordance with a first embodiment of the present invention.
Figure 2:
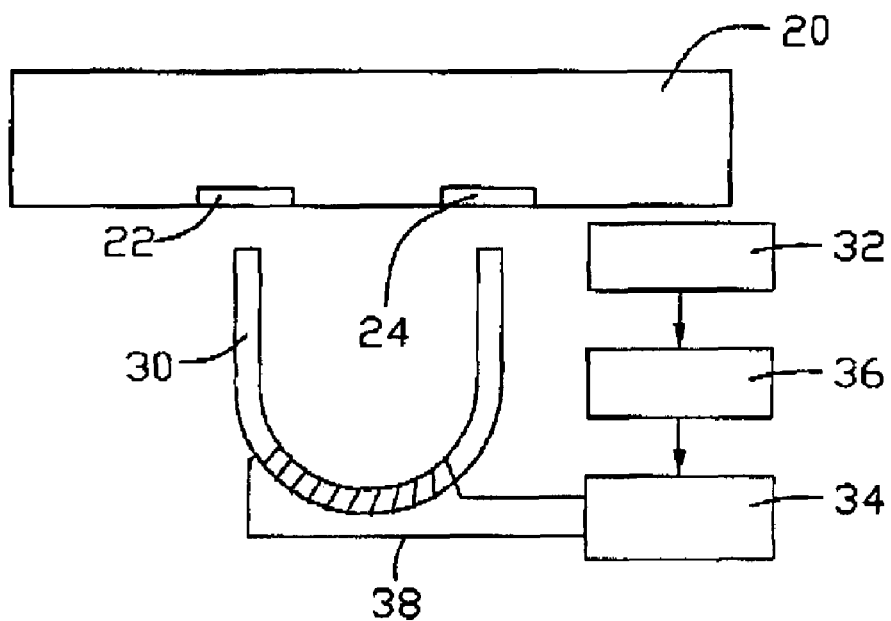
FIG. 2 is a schematic end elevation of the suspension system of the machine guideway of FIG. 1, illustrating the principle of the standard electromagnetic suspension.

Referring to FIGS. 1 and 2, a machine guideway for use in automated processing equipment in accordance with the first embodiment of the present invention comprises a base 10, a slide block 20 and a standard electromagnetic suspension system (not labeled). The base 10 comprises two beams 12, 14, and a sliding groove (not labeled) defined between the two beams 12, 14 for slideably receiving the slide block 20. The standard electromagnetic suspension system comprises a plurality of electromagnets 30, a pair of permanent magnets 22, 24, a plurality of pairs of clearance sensors 32, a current control center 36, and a power source 34. The electromagnets 30 are electrically connected with the power source 34 via a plurality of loops 38, which are respectively wrapped around the respective electromagnets 30. Each electromagnet 30 has two opposite ends (not labeled), and has a structure corresponding to a profile of the groove. The electromagnets 30 are embedded in the base 10 at a periphery of the groove, and are evenly arranged along a length of the groove. Said two ends of each electromagnet 30 are disposed lower than top surfaces of the beams 12, 14 of the base 10. The pair of permanent magnets 22, 24 are provided in a bottom of the slide block 20, and are respectively adjacent said two ends of corresponding electromagnets 30. The clearance sensors 32 are provided in the beams 12, 14 of the base 10, with each pair of clearance sensors 32 being disposed at opposite sides of a corresponding electromagnet 30. The clearance sensors 32 are connected with the power source 34 via the current control center 36.

When the power source 34 provides current to the loops 38, a repulsion force is produced between said two ends of corresponding electromagnets 30 and the permanent magnets 22, 24. The repulsion force has a direction opposite to that of gravitational force acting on the slide block 20, and is adjusted by adjusting the amount of the current. When the repulsion force is greater than the gravitational force, the slide block 20 can freely slide in the groove.

An optimum suspension height of the slide block 20 in the groove is predetermined. When the slide block 20 slides in the groove, information on an actual suspension height of the slide block 20 above the beams 12, 14 is obtained by corresponding clearance sensors 32 and sent to the current control center 36. The current control center 36 accurately controls the current according to the information sent by the clearance sensors 32, to keep the slide block 20 sliding in the groove at the predetermined optimum suspension height. If the actual height is lower than the predetermined height, the current control center 36 increases the current, which increases the repulsion force. If the actual height is higher than the predetermined height, the current control center 36 decreases the current, which decreases the repulsion force. Furthermore, the pairs of clearance sensors 32 act as current switches for the corresponding loops 38. When the slide block 20 slides away from one of the electromagnets 30, this is detected by the corresponding pair of clearance sensors 32, and the current being provided to the electromagnet 30 is cut out. Similarly, when the slide block 20 approaches a next one of the electromagnets 30, current is provided to the electromagnet 30. An original sliding motion of the slide support 50 is provided by an external force.

Figure 3:
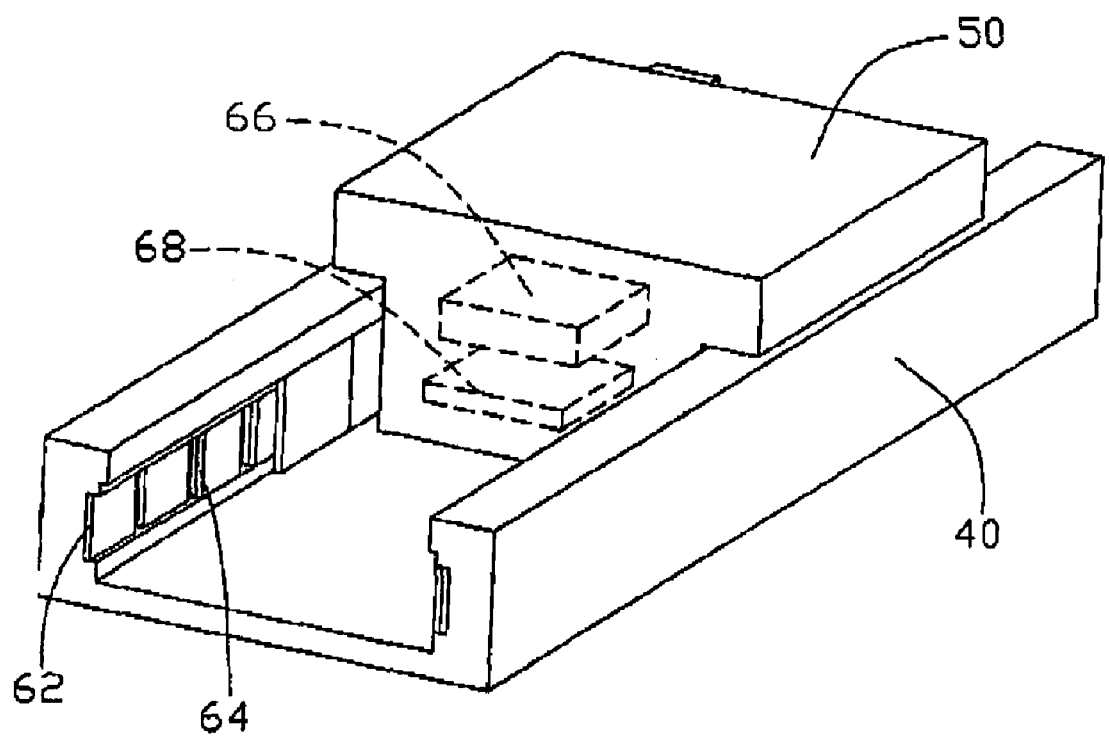
FIG. 3 is an isometric view of a machine guideway employing a superconducting electromagnetic suspension system in accordance with a second embodiment of the present invention.
Figure 4A:
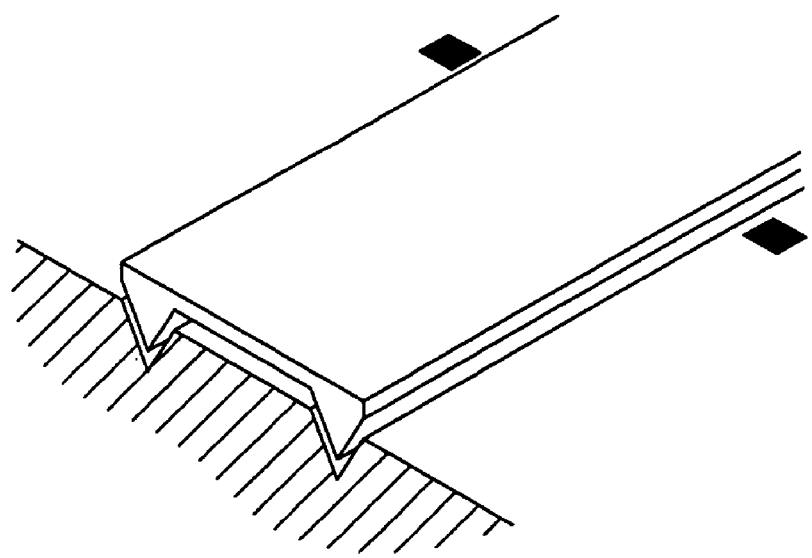
FIGS. 4A-4D are schematic, isometric views showing various dual guideway structures which can employ either of the two manners of suspension described above in relation to the machine guideways of the first and second embodiments.
Figure 4B:
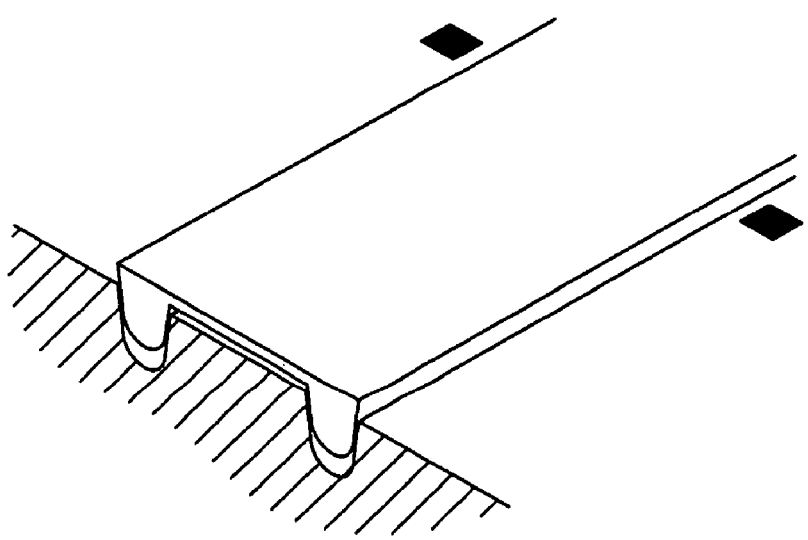
Figure 4C:
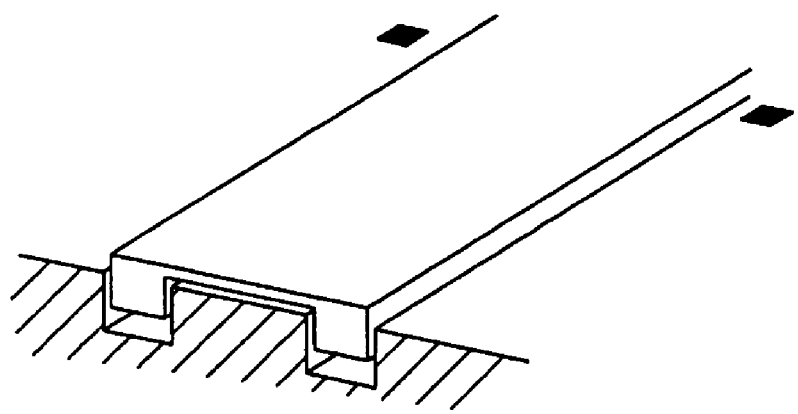
Figure 4D:
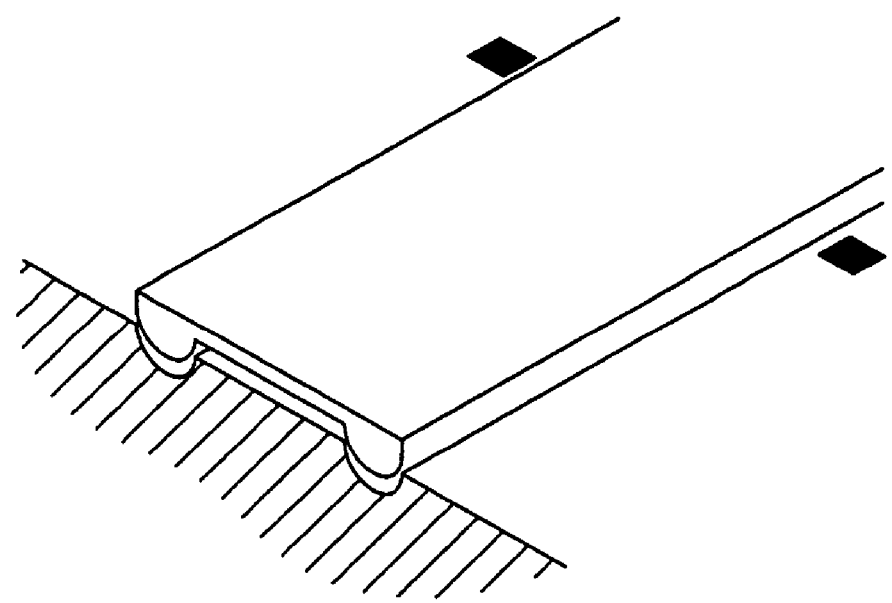

FIG. 3 shows a second embodiment of the machine guideway of the present invention, in which the electromagnetic suspension system is different from tat of the first embodiment. The machine guideway comprises a base 40, a slide block 50, and a superconducting electromagnetic suspension system (not labeled). The superconducting electromagnetic suspension system comprises a driving coil assembly 62, a suspension guiding coil assembly 64, a power inducing assembly 66, and a cooling apparatus 68. The driving coil assembly 62 and the suspension guiding coil assembly 64 are each disposed in opposite side walls of the base 40. The power inducing assembly 66 is provided in the slide block 50, and comprises an alternating current power source (not shown), a pair of power inducing superconducting magnets (not shown) at opposite ends of the slide block 50 respectively, and a pair of suspension-guiding superconducting magnets (not shown). The cooling apparatus 68 is provided in a bottom of the slide block 50. Liquid nitrogen can be used as the coolant in the cooling apparatus 68. The suspension-guiding superconducting magnets are positioned in the cooling apparatus 68.

In operation of the machine guideway of the second embodiment, a three-phase alternating current having a frequency related to a sliding speed of the slide block 50 is provided to the driving coil assembly 62. A moving electromagnetic wave is accordingly produced by the driving coil assembly 62. One of the power inducing superconducting magnets is attracted by the electromagnetic wave, and the other power inducing superconducting magnet is repelled by the electromagnetic wave. Therefore, a propulsion force is produced, which causes the slide block 50 to slide in a sliding groove (not labeled) of the base 40. When the slide block 50 slides away from each of successive pairs of driving coils of the driving coil assembly 62, a direction of the current provided to the driving coil assembly 62 is correspondingly changed. By continuously changing the direction of the current, the slide block 50 can continuously slide. Preferably, a voltage regulator or a frequency modulator is employed to adjust the voltage and frequency of the three-phase alternating current, and thus control the sliding speed of the slide block 50.

When the slide block 50 slides along the base 40 at a particular speed, the suspension-guiding superconducting magnets are provided with current to produce a first electromagnetic field. As the slide block 50 approaches a pair of coils of the suspension guiding coil assembly 64 that are positioned on opposite sides of the base 40 respectively, the first electromagnetic field dissects with the suspension guiding coil assembly 64. The size of flux of the first electromagnetic field is changed according to sliding of the slide block 50, and therefore an induced current is produced in the suspension guiding coil assembly 64. A second electromagnetic field produced by the induced current has a direction opposite to that of the first electromagnetic field, and therefore a repulsion force is produced between the two electromagnetic fields and applied to the slide block 50. A direction of the repulsion force is opposite to a direction of gravitational force acting on the slide block 50. When the sliding speed of the slide block 50 is greater than a threshold value, the repulsion force is greater than the gravitational force, and the slide block 50 is suspended. The faster the speed of the slide block 50, the higher the slide block 50 is suspended above the base 40.

An optimum suspension height of the slide block 50 above the base 40 is predetermined. If the actual height of the slide block 50 is lower than the predetermined height, a distance between the suspension-guiding superconducting magnets and the suspension guiding coil assembly 64 is decreased. The induced current is increased, and a stronger repulsion force is produced. Thus the suspension height of the slide block 50 is increased. On the contrary, if the actual height of the slide block 50 is higher than the predetermined height, the distance between the suspension-guiding superconducting magnets and the suspension guiding coil assembly 64 is increased. The induced current is decreased, and the repulsion force is reduced. Thus the suspension height of the slide block 50 is decreased. An original sliding motion of the slide block 50 is provided by an external force.

An optimum sliding axis of the slide block 50 is defined along an imaginary centerline of the groove. If the sliding slide block 50 deviates from the centerline, the suspension-guiding superconducting magnets approach a first coil of each of two corresponding pairs of coils of the suspension guiding coil assembly 64. The induced current at the first coil produced by the approaching suspension-guiding superconducting magnets is increased, and a stronger repulsion force is produced. At the same time, the suspension-guiding superconducting magnets move away from a second coil of each of the two pairs of coils of the suspension guiding coil assembly 64. The induced current at the second coil produced by the departing suspension-guiding superconducting magnets is decreased, and a weaker repulsion force is produced. The stronger and weaker repulsion forces act in opposite directions, and produce a net restitution force that makes the slide block 50 return to the centerline.

The superconducting magnet is preferably a kind of yttrium barium copper oxide, represented by the formula $Y_2Ba_3Cu_7O_X$. Alternatively, the superconducting magnet can be a superconducting wire made of copper wire embedded with a plurality of super-fine core wires, the core wires being made of an alloy of niobium and titanium.

FIGS. 4A-4D show various dual guideway structures which can employ either of the two manners of suspension as described above in relation to the machine guideways of the first and second embodiments. As shown, the dual guideway structures can be V-shaped, U-shaped, rectangular, semicircular or arcuate.

In summary, the machine guideway of the present invention enables enhanced speed of processing. In addition, unlike conventional guideways, the machine guideway does not sustain any wear due to friction, and does not sustain any deformation due to friction heat.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A machine guideway configured for use in automated processing equipment, comprising:
   a base defining a sliding groove;
   a slide block slideably received in the sliding groove, the slide block being configured for supporting a workpiece to be worked upon by the automated processing equipment; and
   an electromagnetic suspension system for providing a repulsion force having a direction opposite to that of gravitational force acting on the slide block during sliding of the slide block along the sliding groove to an original starting position, the electromagnetic suspension system being one of a first electromagnetic suspension system and a second electromagnetic suspension system, the second electromagnetic suspension system being a superconducting electromagnetic suspension system, the first electromagnetic suspension system comprising a plurality of electromagnets, a pair of permanent magnets, a plurality of pairs of clearance sensors, a current control center and a power source, the clearance sensors each being configured for measuring an actual suspension height of the slide block relative to the sliding groove.

2. The machine guideway as described in claim 1, wherein the electromagnets of the first electromagnetic suspension system are embedded in the base at a periphery of the sliding groove and are evenly arranged along a length of the sliding groove.

3. The machine guideway as described in claim 2, wherein the electromagnets are electrically connected with the power source via a plurality of loops, which are respectively wrapped round the respective electromagnets.

4. The machine guideway as described in claim 1, wherein the pair of permanent magnets of the first electromagnetic suspension system is positioned in a bottom of the slide block.

5. The machine guideway as described in claim 1, wherein the clearance sensors of the first electromagnetic suspension system are respectively electrically connected to the power source via the current control center.

6. The machine guideway as described in claim 1, wherein the superconducting suspension system comprises a driving coil assembly, a suspension guiding coil assembly, a power inducing assembly and a cooling apparatus.

7. The machine guideway as described in claim 6, wherein the driving coil assembly and the suspension guiding coil assembly are each disposed in opposite side walls of the base.

8. The machine guideway as described in claim 6, wherein the power inducing assembly is provided in the slide block, and comprises an alternating current power source, a pair of power inducing superconducting magnets at opposite ends of the slide block respectively, and a pair of suspension guiding superconducting magnets.

9. The machine guideway as described in claim 8, wherein the superconducting magnets comprise at least one yttrium barium copper oxide represented by the formula $Y_2Ba_3Cu_7O_x$.

10. The machine guideway as described in claim 8, wherein each of the superconducting magnets is a superconducting wire made of copper wire embedded with a plurality of core wires, the core wires being made of an alloy of niobium and titanium.

11. The machine guideway as described in claim 6, wherein the cooling apparatus is provided in a bottom of the slide block.

* * * * *